United States Patent
Boniface et al.

(10) Patent No.: US 9,726,197 B2
(45) Date of Patent: Aug. 8, 2017

(54) TURBOMACHINE ELEMENT

(75) Inventors: Jean-Christophe Gerard Roger Boniface, Paris (FR); Vincent Perrot, Maisons Alfort (FR); Agnes Pesteil, Alfortville (FR)

(73) Assignee: SNECMA, Paris (FR)

( * ) Notice: Subject to any disclaimer, the term of this patent is extended or adjusted under 35 U.S.C. 154(b) by 811 days.

(21) Appl. No.: 14/125,454

(22) PCT Filed: Jun. 11, 2012

(86) PCT No.: PCT/FR2012/051306
§ 371 (c)(1),
(2), (4) Date: Apr. 28, 2014

(87) PCT Pub. No.: WO2012/172246
PCT Pub. Date: Dec. 20, 2012

(65) Prior Publication Data
US 2014/0286768 A1     Sep. 25, 2014

(30) Foreign Application Priority Data

Jun. 14, 2011  (FR) ..................... 11 55158

(51) Int. Cl.
| | | |
|---|---|---|
| *F04D 29/68* | (2006.01) |
| *F04D 29/54* | (2006.01) |
| *F01D 5/14*  | (2006.01) |
| *F04D 29/52* | (2006.01) |
| *F01D 9/02*  | (2006.01) |

(52) U.S. Cl.
CPC .......... *F04D 29/681* (2013.01); *F01D 5/145* (2013.01); *F01D 9/02* (2013.01); *F04D 29/522* (2013.01); *F04D 29/544* (2013.01); *F05D 2240/127* (2013.01); *Y02T 50/671* (2013.01); *Y02T 50/673* (2013.01)

(58) Field of Classification Search
CPC .......... F01D 5/145; F01D 9/02; F04D 29/522; F04D 29/542; F04D 29/681; F05D 2240/127; Y02T 50/671; Y02T 50/673
See application file for complete search history.

(56) References Cited

U.S. PATENT DOCUMENTS

| 2,844,001 A | 7/1958 | Alford |
|---|---|---|
| 4,076,454 A | 2/1978 | Wennerstrom |

(Continued)

FOREIGN PATENT DOCUMENTS

| DE | 10 2009 03375 | 1/2011 |
|---|---|---|
| EP | 1 927 723 | 6/2008 |

(Continued)

OTHER PUBLICATIONS

International Search Report Issued Sep. 19, 2012 in PCT/FR12/051306 Filed Jun. 11, 2012.

(Continued)

*Primary Examiner* — Audrey K Bradley
(74) *Attorney, Agent, or Firm* — Oblon, McClelland, Maier & Neustadt, L.L.P.

(57) ABSTRACT

A turbomachine element including an airfoil set including a plurality of airfoils that are offset from one another in a lateral direction, and upstream from at least one end of each airfoil, a group of a plurality of vortex generator devices that are mutually offset both laterally and axially.

9 Claims, 4 Drawing Sheets

(56) References Cited

U.S. PATENT DOCUMENTS

| | | |
|---|---|---|
| 2003/0152456 A1 | 8/2003 | Guemmer |
| 2010/0143140 A1* | 6/2010 | Guemmer ............... F01D 5/143 416/193 A |
| 2011/0014037 A1 | 1/2011 | Clemen |
| 2011/0150653 A1* | 6/2011 | Montgomery .......... F01D 5/145 416/146 R |
| 2014/0010638 A1 | 1/2014 | Perrot et al. |

FOREIGN PATENT DOCUMENTS

| | | |
|---|---|---|
| JP | 57-73805 A | 5/1982 |
| WO | WO 2006/080386 A1 | 8/2006 |
| WO | 2008 046389 | 4/2008 |
| WO | WO 2013/132190 A1 | 9/2013 |

OTHER PUBLICATIONS

Japanese Office Action issued Jan. 5, 2016 in Patent Application No. 2014-515256 (English Translation only).
Chinese Office Action issued Jun. 23, 2015 in Patent Application No. 201280029443.2 (English Translation only).

* cited by examiner

TURBOMACHINE ELEMENT

BACKGROUND OF THE INVENTION

Field of the Invention

The present invention relates to the field of turbomachines, and in particular to a turbomachine element comprising an airfoil set with a plurality of airfoils that are offset from one another in a lateral direction, and vortex generator devices arranged upstream from said set in an axial direction that is perpendicular to said lateral direction.

Description of the Related Art

The term "turbomachine" is used in the present specification to designate any machine in which energy can be transferred between a fluid flow and at least one airfoil set, such as for example a compressor, a pump, a turbine, or indeed a combination of at least two of them. Such a turbomachine may have a plurality of stages, each stage normally having two airfoil sets, namely a movable blade set and a stationary guide vane set. Each airfoil set comprises a plurality of airfoils offset from one another in a lateral direction. Typically, the airfoils are arranged radially around a central axis. Thus, one such airfoil set forms a rotor, when it comprises a movable blade set, or else it forms a stator when it comprises a guide vane set. In such a stator, each vane is typically connected to an inner shroud by a proximal end or vane root, and to an outer shroud by an outer end or vane tip. The inner and outer shrouds are normally substantially coaxial, as shown for example in the French patent application published under the number FR 2 896 019.

Each airfoil presents a profile with a suction side, a pressure side, a leading edge, and a trailing edge, that in operation are subjected to the flow of a working fluid. In the description below, the terms "upstream" and "downstream" are defined relative to the normal flow direction of the working fluid. Under certain operating conditions, in particular in a high pressure compressor, it can happen that this flow separates from the suction side. More particularly at an airfoil root, a three-dimensional separation can occur, forming a "corner vortex". This corner vortex is generated by an accumulation of particles having low kinetic energy in the corner formed between the suction side and the inner shroud forming the base of the airfoil. It gives rise in particular to a significant loss of efficiency in the compressor.

In order to reduce such corner vortices, proposals are made in international patent application WO 2008/046389 A1, to place vortex generator devices upstream from the airfoil set. In operation, the vortices generated by those devices deliver energy to the flow of the boundary layers adjacent to the suction side, in order to prevent local separation forming the airfoil corner vortex.

Nevertheless, using such vortex generator devices leads to certain problems. Firstly, it is preferable for the vortex generator device to offer as little resistance as possible to the flow of working fluid in order to minimize aerodynamic losses. Secondly, the device should preferably redirect the fluid flow locally in such a manner as to direct the vortex it generates towards the suction side. Typically, this implies that the vortex generator device must itself have an airfoil profile with, at its leading edge, an angle of attack that is small relative to the general flow direction of the fluid, while nevertheless presenting a large angle of incidence at its trailing edge. Nevertheless, it is difficult and expensive to fabricate a turbomachine element incorporating vortex generator airfoil devices, which are normally small in size.

BRIEF SUMMARY OF THE INVENTION

The present invention seeks to remedy those drawbacks by proposing a turbomachine element having an airfoil set with a plurality of airfoils that are offset from one another in a lateral direction, and vortex generator devices arranged upstream from said airfoil set in an axial direction perpendicular to said lateral direction in order to reduce effectively the local separations at the suction sides of the airfoils, while presenting low aerodynamic losses, and while being easier to fabricate.

In a first aspect, in at least one embodiment, this object is achieved by the fact that the turbomachine element comprises a group of a plurality of vortex generator devices upstream from one end of each airfoil, the vortex generator devices in each group being mutually offset both laterally and axially. In particular, each group of at least three vortex generator devices may comprise at least three such devices. The axial and tangential offset between the various vortex generator devices in the group upstream from each airfoil serves to redirect the vortices generated by the devices towards the suction side of the airfoil, even if each individual device is oriented at an angle of attack relative to the fluid flow that is small, e.g. lying in the range 5 degrees to 15 degrees in order to minimize the resistance it presents, and is of a shape that is simple in order to make it easier to produce.

In a second aspect, at least some of the vortex generator devices comprise at least one fin. In particular, the fin may present a chord that is substantially straight. Such a fin may form a vortex generator device that is particularly simple to fabricate. Nevertheless, other types of vortex generator device could also be taken into consideration as alternatives to fins or in combination therewith. For example, at least some of the vortex generator devices may include at least one notch formed in a support for the end of the airfoil.

In a third aspect, the vortex generator devices in each group present orientations that are substantially parallel, thereby further simplifying fabrication of the vortex generator devices, while limiting aerodynamic losses.

In a fourth aspect, the airfoils of the turbomachine element airfoil set are arranged radially around a central axis. Thus, the turbomachine is adapted so that the movable airfoil set rotates about the central axis. Nevertheless, other forms of turbomachine are possible in principle, e.g. with the airfoils moving in a linear manner. In a radial set, each airfoil has a proximal end referred to as a "root" and a distal end referred to as a "tip". Under such circumstances, a group of a plurality of vortex generator devices may be situated upstream from each root. Since corner vortices are more likely to form at a root, vortex generator devices are more useful in that location. Nevertheless, as an alternative or in addition to that configuration, a group of a plurality of vortex generator devices may also be situated upstream from an airfoil tip. Although corner vortices are less likely to form at airfoil tips, vortex generator devices may also possibly be useful for combating such a phenomenon at that location.

In a fifth aspect, the set of airfoils of the turbomachine element is an outlet guide vane set. In a compressor, in particular in a high pressure compressor, corner vortices are more likely to form at an outlet guide vane set. Nevertheless, as an alternative or in addition to such an outlet guide vane set, the turbomachine element may also comprise a movable airfoil set, in particular a set of rotor blades, with such vortex generator devices arranged upstream from the movable blade set in order to combat the formation of corner vortices in that location.

The vortex generator devices may be formed integrally with the airfoil set, e.g. by incorporating their shapes in a mold for making the airfoil set by casting, and/or they may be formed integrally with the airfoil set by machining them in its bulk. Nevertheless, as an alternative they may be produced separately and fastened in front of the airfoil. In any event, the height of the vortex generator devices may in particular be about 2% to 8% of the height of the airfoils immediately downstream therefrom.

The present description also relates to a turbomachine having at least one turbomachine element of the invention. Such a turbomachine may be a compressor, a pump, a turbine, or indeed a combination of at least two of them, such as for example a turbojet, a turboshaft engine, a turboprop, a turbopump, and/or a turbocompressor. In particular, in the turbomachine, said turbomachine element may be a compressor element. Nevertheless, the turbomachine element could alternatively be a pump element or a turbine element.

BRIEF DESCRIPTION OF THE SEVERAL VIEWS OF THE DRAWINGS

The invention can be well understood and its advantages appear better on reading the following detailed description of five embodiments given as non-limiting examples. The description refers to the accompanying drawings, in which.

DETAILED DESCRIPTION OF THE INVENTION

Figure 1:
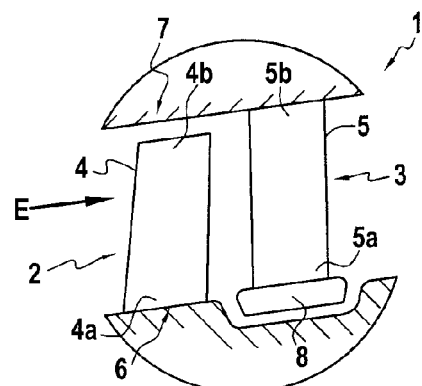
FIG. 1 is a diagrammatic longitudinal section view of a prior art compressor.
Figure 1:
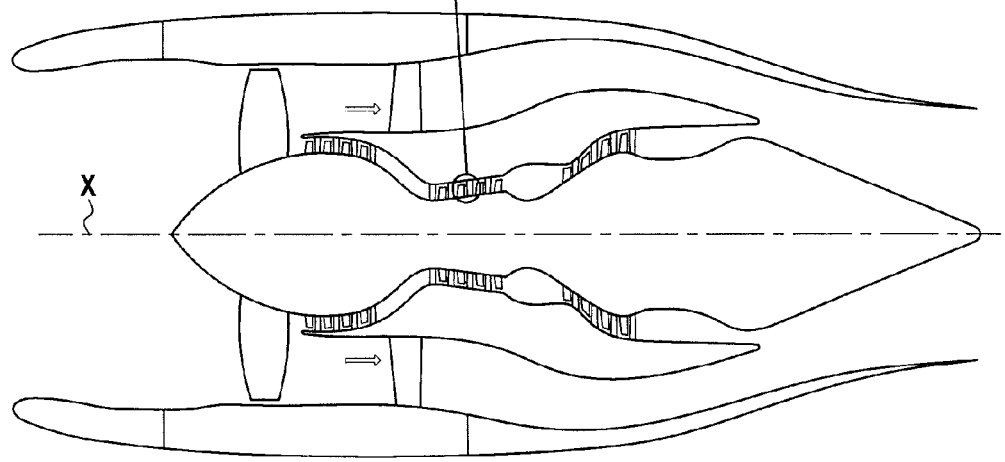

FIG. 1 shows a bypass turbojet, and in greater detail a stage 1 of its high pressure compressor. This typical prior art compressor stage 1 comprises two main portions: a rotatably-movable airfoil set 2 of "rotor" blades; and a stationary airfoil set 3 of "stator" guide vanes. Both in the rotor 2 and in the stator 3, the blades 4 and the vanes 5 are arranged radially around a central axis X. Thus, each blade 4 of the rotor 2 presents a proximal end 4a known as the blade "root" secured to a rotary hub 6, and a distal end 4b referred to as a blade "tip" adjacent to a stationary outer shroud 7 of a casing of the compressor 1. Similarly, each vane 5 of the stator 3 presents a proximal end 5a, also referred to as a vane "root", which is secured to a stationary inner shroud 8, and a distal end 5b, also referred to as a vane "tip", secured to the outer shroud 7.

In operation, the rotation of the blades 4 of the rotor 2 about the central axis X drives the working fluid, normally a gas or a gas mixture such as air, both axially parallel to the central axis X and circumferentially in a lateral direction perpendicular to the axial direction. Downstream from the rotor 2, the vanes 5 of the stator 3 straighten the flow of working fluid along the axial direction, and in so doing transform a large fraction of the dynamic pressure of the working fluid into static pressure.

Figure 2:
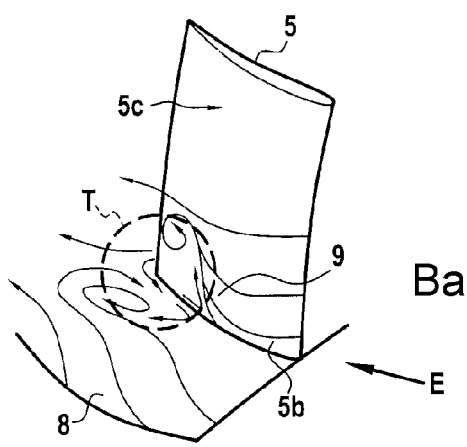
FIG. 2 is a diagrammatic perspective view of a vane of the FIG. 1 compressor, subjected to a corner vortex.

A particular problem with such a compressor stage 1 is shown in FIG. 2. At the vane root 5b, on the suction side 5c of a vane 5 of the stator 3, the confluence of the boundary layers on the suction side 5c and on the inner shroud 8 produces a low energy zone that can give rise to separation 9 referred to as a "corner vortex". This corner vortex 9 has a clearly negative impact on the aerodynamic performance of the compressor 1. In the stator 3, this can be further exacerbated by the working fluid flowing back under the inner shroud 8 from downstream to upstream relative to the stator 3, thereby generating a leakage flow between the hub 6 of the rotor 2 and the inner shroud 8, which leakage flow disturbs the flow of the driving fluid directly upstream from the vanes 5 of the stator 3. Nevertheless, corner vortices may also form on the blades 4 of the rotor 2, and both in the rotor 2 and in the stator 3, they may form both at the root and at the tip of an airfoil.

Figure 3:
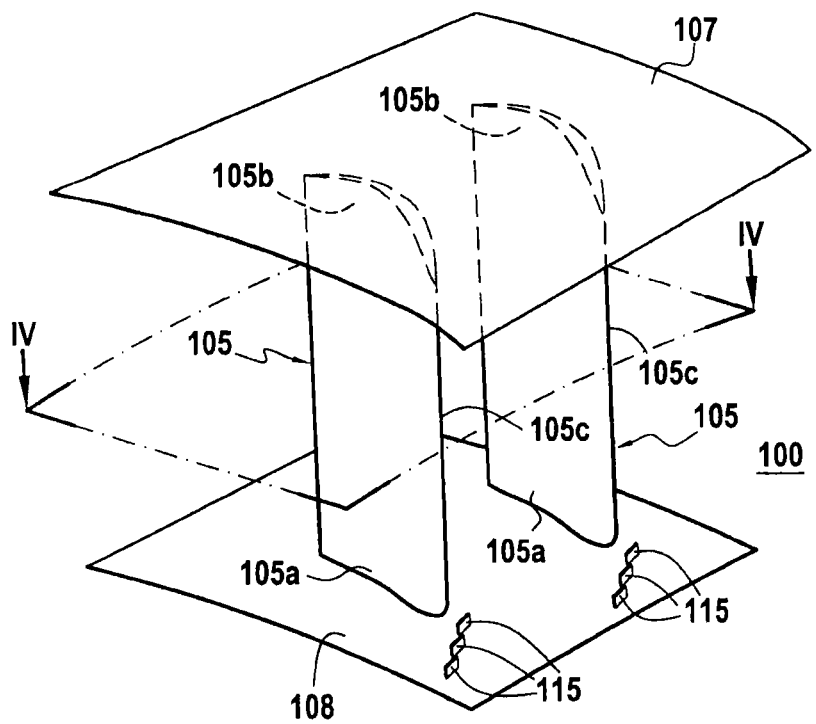
FIG. 3 is a diagrammatic perspective view of a segment of a compressor element in a first embodiment.

FIG. 3 shows a first embodiment in which a compressor element 100 comprises a set of guide vanes 103 in the form of a stator having a plurality of vanes 105 arranged radially about a central axis X and offset from one another in a lateral direction, i.e. a circumferential direction. This compressor element 100 is designed to be located directly downstream from a rotor (not shown) rotating about the central axis X in order to straighten out the flow of the working fluid downstream from the rotor so that it flows in an axial direction substantially parallel to the central axis X and perpendicular to the lateral direction. In this guide vane set 103, as in the prior art, each vane 105 presents a vane root 105a secured to an inner shroud 108, and a vane tip 105b secured to an outer shroud 107.

Figure 4:
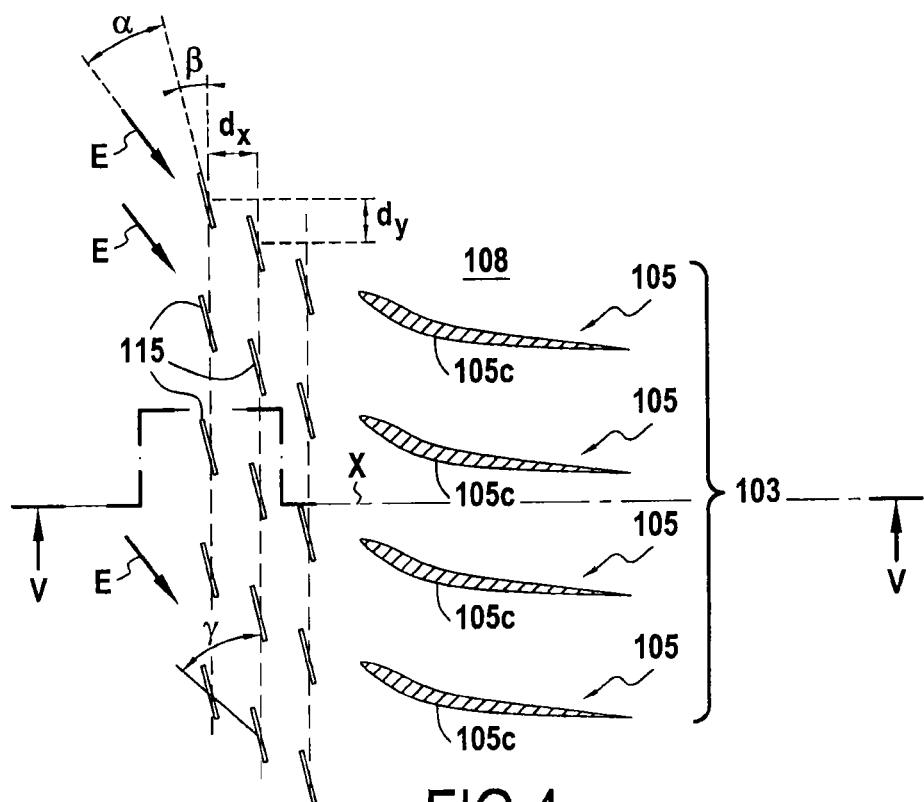
FIG. 4 is a diagrammatic developed view of the FIG. 3 segment in section on curved plane IV-IV.
Figure 5:
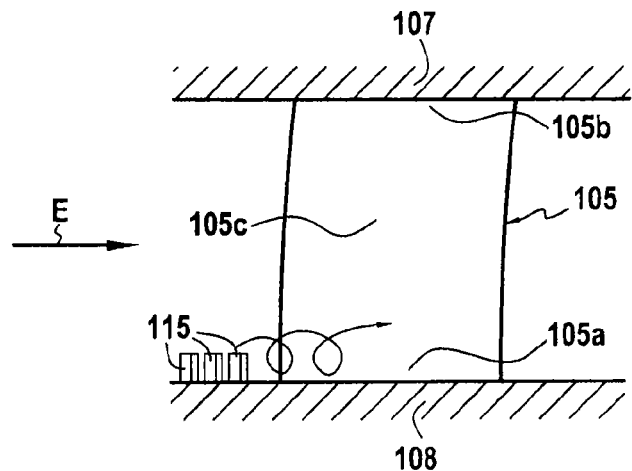
FIG. 5 is a diagrammatic longitudinal view of the segment of FIGS. 3 and 4 in section on line V-V.

In order to prevent, at least in part, the formation of a corner vortex at the vane root 105a between the suction side 105c and the inner shroud 108, the compressor element 100 in this first embodiment also includes a group of three vortex-generator devices 115 upstream from each vane root 105a, these devices being in the form of straight fins secured to the inner shroud 108. Since these fins 115 are comparatively simple in shape, there are no particular problems involved in fabricating them, even integrally with the inner shroud 108, by using fabrication methods that are known to the person skilled in the art. In particular, they may be integrally molded with the inner shroud 108 and the remainder of the guide vane set 103, and they may optionally be subjected to finishing operations after casting, or else they may be fabricated separately and subsequently fastened on the inner shroud 108 using conventional means. Alternatively, it is also possible for them to be machined in the bulk of the inner shroud 108. Typically, their height may lie in the range about 2% to 8% of the height of the vanes 105. As can be seen in particular in FIGS. 4 and 5, these fins 115 are substantially parallel to one another and they present an angle of attack α, which may for example lie in the range 5 degrees to 15 degrees relative to the flow direction E of the working fluid upstream from the stator 103, so as to generate vortices downstream from each fin 115, but without presenting excessive resistance to the flow. They also present an angle β relative to the lateral direction. Between them, each pair of adjacent fins 115 presents an axial offset $d_x$ and a lateral offset $d_y$. The alignment of the fins 115 thus presents an angle $\gamma=\arctan(d_x/d_y)$ relative to the lateral direction, which angle is substantially greater than the angle β in the embodiment shown. The axial and lateral offsets of the fins 115 in each group cause the vortices generated by each of the fins 115 to be directed by mutual interaction towards the suction side 105c of the vane 105, so as to be more effective in preventing local separation that can give rise to a corner vortex. The vortex created by each fin 115 is reinforced by the vortex of the fin 115 that is directly downstream, thereby also slightly changing the direction of the reinforced vortex towards the direction of the axis of its chord. Although in the embodiment shown, both the axial offset $d_x$ and the lateral offset $d_y$ are the same both between the first and second fins 115 and also between the second and third fins 115 in each group, it is also possible to envisage having different offsets between the various rows of vortex generator devices downstream from the vane set.

Figure 6:
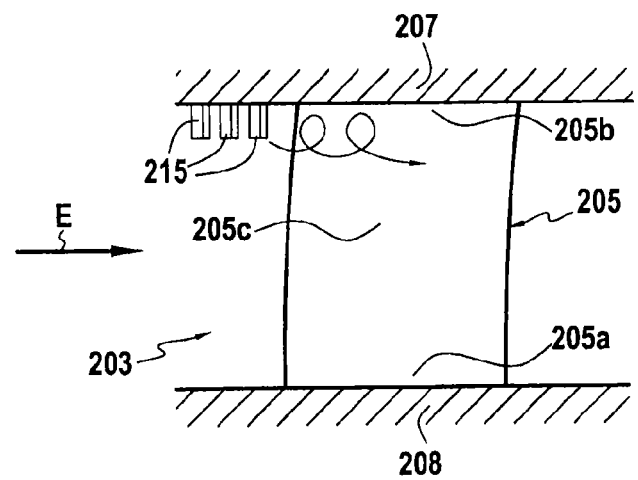
FIG. 6 is a diagrammatic longitudinal section view of a compressor element in a second embodiment.

Although in this first embodiment the vortex generator devices are arranged on the inner shroud, for the purpose of preventing a corner vortex forming at the vane root, as an alternative or in addition to this arrangement, it is also possible to situate analogous devices on the outer shroud in order to prevent a corner vortex forming at the vane tip. Thus, in a second embodiment shown in FIG. 6, a compressor element 200 likewise comprises a guide vane set 203 in the form of a stator having a plurality of vanes 205 arranged radially around a central axis X and offset from one another in a lateral direction, i.e. a circumferential direction. This compressor element 200 is likewise for being located directly downstream from a rotor (not shown) rotating about the central axis X, for the purpose of straightening the flow of working fluid downstream from the rotor towards an axial direction that is substantially parallel to the central axis X and perpendicular to the lateral direction. In this guide vane set 203, as in the first embodiment, each vane 205 presents a vane root 205a secured to an inner shroud 208, and a vane tip 205b secured to an outer shroud 207. However, in this second embodiment, the group of three vortex generator devices 215 is situated upstream from each vane tip 205a. The shape, the arrangement, and the operation of these fins 215 is otherwise substantially analogous to that of the fins in the first embodiment, with an angle of attack that is relatively small, e.g. lying in the range 5 degrees to 15 degrees relative to the fluid flow, with a height lying in the range about 2% to 8% of the height of the vanes 205, and with axial and lateral offsets between each pair of adjacent fins. In this embodiment, the fins 215 may in particular be molded integrally with the outer shroud 207 and the remainder of the guide vane set 203, and they may possibly be subjected to finishing operations on leaving the foundry, or else they may be fabricated separately and subsequently fastened to the outer shroud 207 by conventional means. Nevertheless, as an alternative, they could also be machined in the bulk of the outer shroud 207.

Figure 7:
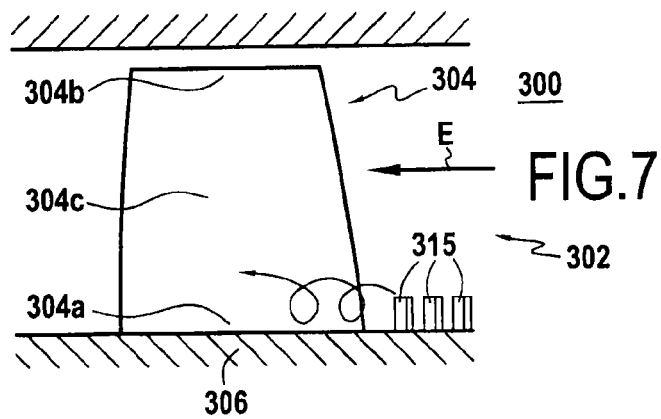
FIG. 7 is a diagrammatic longitudinal section view of a compressor element in a third embodiment.

Although these first and second embodiments of the vortex generator devices are arranged directly upstream from the guide vane set, in order to prevent corner vortices forming in the guide vane set, and as an alternative or in addition to these other arrangements, it is also possible to situate analogous devices upstream from the movable blade set. Thus, in a third embodiment shown in FIG. 7, a compressor element 300 comprises a movable blade set 302 in the form of a rotor having a plurality of blades 304 arranged radially around a central axis X and offset from one another in a lateral direction, i.e. a circumferential direction. The compressor element 300 is designed to rotate about the central axis X in order to drive a working fluid, with the flow of that fluid subsequently being straightened towards an axial direction that is substantially parallel to the central axis X and perpendicular to the lateral direction by means of a guide vane set constituting a stationary stator (not shown). In this rotary blade set 302, each blade 304 has a blade root 304a secured to a hub 306, and a blade tip 304b, together with a group of three vortex generator devices 315 situated upstream from each blade root 304a in order to prevent, at least in part, the formation of corner vortices in the rotor 302. The shape, the arrangement, and the operation of these fins 315 is otherwise substantially analogous to that of the fins in the above-described embodiments, with an angle of attack that is relatively small, e.g. lying in the range 5 degrees to 15 degrees relative to the flow of the fluid, with a height of about 2% to 8% of the height of the blades 305, and with axial and lateral offsets between each pair of adjacent fins. Typically, they may be machined in the bulk of the hub 306. Nevertheless, they could alternatively be molded integrally with the hub 306 and the remainder of the rotor 302, and optionally they could be subjected to finishing operations on leaving the foundry, or else they could be fabricated separately and subsequently fastened on the hub 306 by conventional means.

Figure 8:
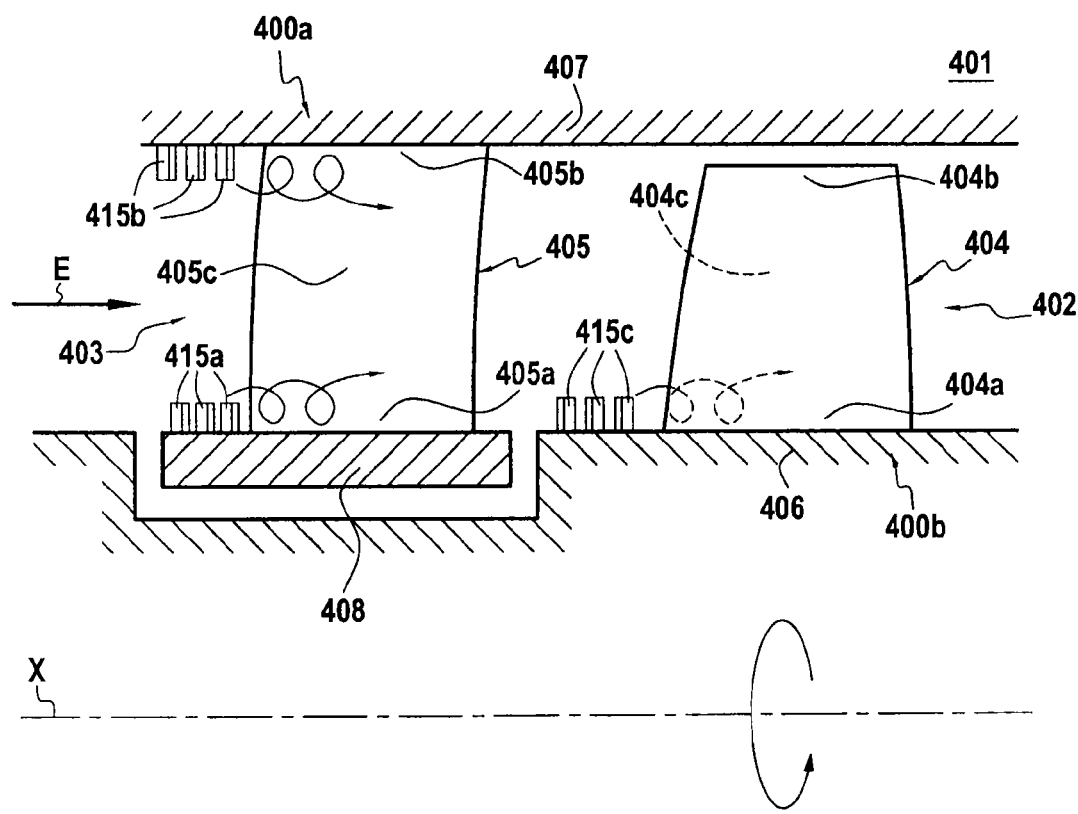
FIG. 8 is a diagrammatic longitudinal section view of a turbine stage made up of a turbine stator in a fourth embodiment and a turbine rotor in a fifth embodiment.

Although in the above-described embodiments the vortex generator devices are arranged on compressor elements, it is also possible to apply the same principle to other turbomachine elements, such as for example to pump elements or to turbine elements. Thus, in FIG. 8 there can be seen a turbine stage 401 having a first turbine element 400a with a stationary guide vane set 403 in the form of a stator, and downstream therefrom a second turbine element 400b with a movable blade set 402 in the form of a rotor. The guide vane set 403 has a plurality of vanes 405 arranged radially about a central axis X and offset from one another in a lateral direction, i.e. a circumferential direction. In this guide vane set 403, as in the first embodiment, each vane 405 presents a vane root 405a secured to an inner shroud 408, and a vane tip 405b secured to an outer shroud 407. In order to prevent, at least in part, the formation of corner vortices at the vane root 405a, between the suction side 405c and the inner shroud 408, and also at the blade tip 405b, between the suction side 405c and the outer shroud 407, this first turbine element 400 in a fourth embodiment also includes a group of three vortex generator devices 415a upstream from each vane root 405a in the form of straight fins secured to the inner shroud 408, and a group of three vortex generator devices 415b upstream from each vane tip 405b in the form of straight fins secured to the outer shroud 407. The shape, the arrangement, and the operation of these two groups of fins 415a and 415b are otherwise substantially analogous to the fins of the first and second embodiments, with an angle of attack that is relatively small, e.g. in the range 5 degrees to 15 degrees relative to the fluid flow, with a height of about 2% to 8% of the height of the vanes 405, and with axial and lateral offsets between each pair of adjacent fins. They may likewise be fabricated using the same production methods.

The second turbine element 400b, situated downstream from the guide vane set 403 comprises a movable blade set 402 in the form of a rotor with a plurality of blades 404 arranged radially around the central axis X and offset from one another in the lateral direction. This second turbine element 400b is for rotating about the central axis X, under drive from the fluid flow. In the movable blade set 402, each blade 404 presents a blade root 404a secured to a hub 406, and a blade tip 404b, and the group of three vortex generator devices 415b is situated upstream from each blade root 404a in order to prevent, at least in part, the formation of corner vortices in the rotor 402. The shape, the arrangement and the operation of these fins 415c are otherwise substantially analogous to the fins of the above-described embodiments, with an angle of attack that is relatively small, e.g. in the range 5 degrees to 15 degrees relative to the fluid flow, with a height of about 2% to 8% of the height of the blades 404, and with axial and lateral offsets between each pair of adjacent fins. The fins may likewise be fabricated using the same production methods.

Although the present invention is described above with reference to specific embodiments, it is clear that various modifications and changes can be carried out on those embodiments without going beyond the general scope of the invention as defined by the claims. In particular, individual characteristics of the various embodiments shown may be combined in additional embodiments. In addition, although the vortex generator devices shown are in the form of rectangular fins, the person skilled in the art may consider using other shapes, e.g. fins that are triangular or notches in the shrouds and/or the hub, depending on circumstances. Consequently, the description and the drawings should be considered as being illustrative rather than restrictive.

The invention claimed is:

1. A turbomachine element comprising:
    an airfoil set including a plurality of airfoils offset from one another in a lateral direction; and
    a group of a plurality of parallel fins arranged upstream, in an axial direction perpendicular to said lateral direction, from at least one end of each airfoil of the airfoil set, the fins of each group being mutually offset both laterally and axially.

2. A turbomachine element according to claim 1, wherein each group of fins includes at least three fins.

3. A turbomachine element according to claim 1, wherein the fins are straight.

4. A turbomachine element according to claim 1, wherein the airfoil set is an outlet guide vane set.

5. A turbomachine element according to claim 1, wherein a height of the fins is 2% to 8% of a height of the airfoils.

6. A turbomachine element according to claim 1, wherein the airfoils of the set are arranged radially around a central axis, each airfoil including a proximal end and a distal end.

7. A turbomachine element according to claim 6, wherein the group of the plurality of fins is situated upstream from the proximal end of each airfoil.

8. A turbomachine comprising:
    at least one turbomachine element comprising:
    an airfoil set including a plurality of airfoils offset from one another in a lateral direction; and
    a group of a plurality of parallel fins arranged upstream, in an axial direction perpendicular to said lateral direction, from at least one end of each airfoil, the fins of each group being mutually offset both laterally and axially.

9. A turbomachine comprising:
    at least one compressor element comprising:
    an airfoil set including a plurality of airfoils offset from one another in a lateral direction; and
    a group of a plurality of parallel fins arranged upstream, in an axial direction perpendicular to said lateral direction, from at least one end of each airfoil, the fins of each group being mutually offset both laterally and axially.

* * * * *